June 23, 1959  F. T. NETTLES ET AL  2,892,150
THICKNESS GAUGE
Filed May 12, 1953  7 Sheets-Sheet 1

INVENTORS
FORREST TRUETT NETTLES,
ALEXANDER CAMPBELL, JR.

BY

ATTORNEY

June 23, 1959     F. T. NETTLES ET AL     2,892,150
THICKNESS GAUGE
Filed May 12, 1953                               7 Sheets-Sheet 4
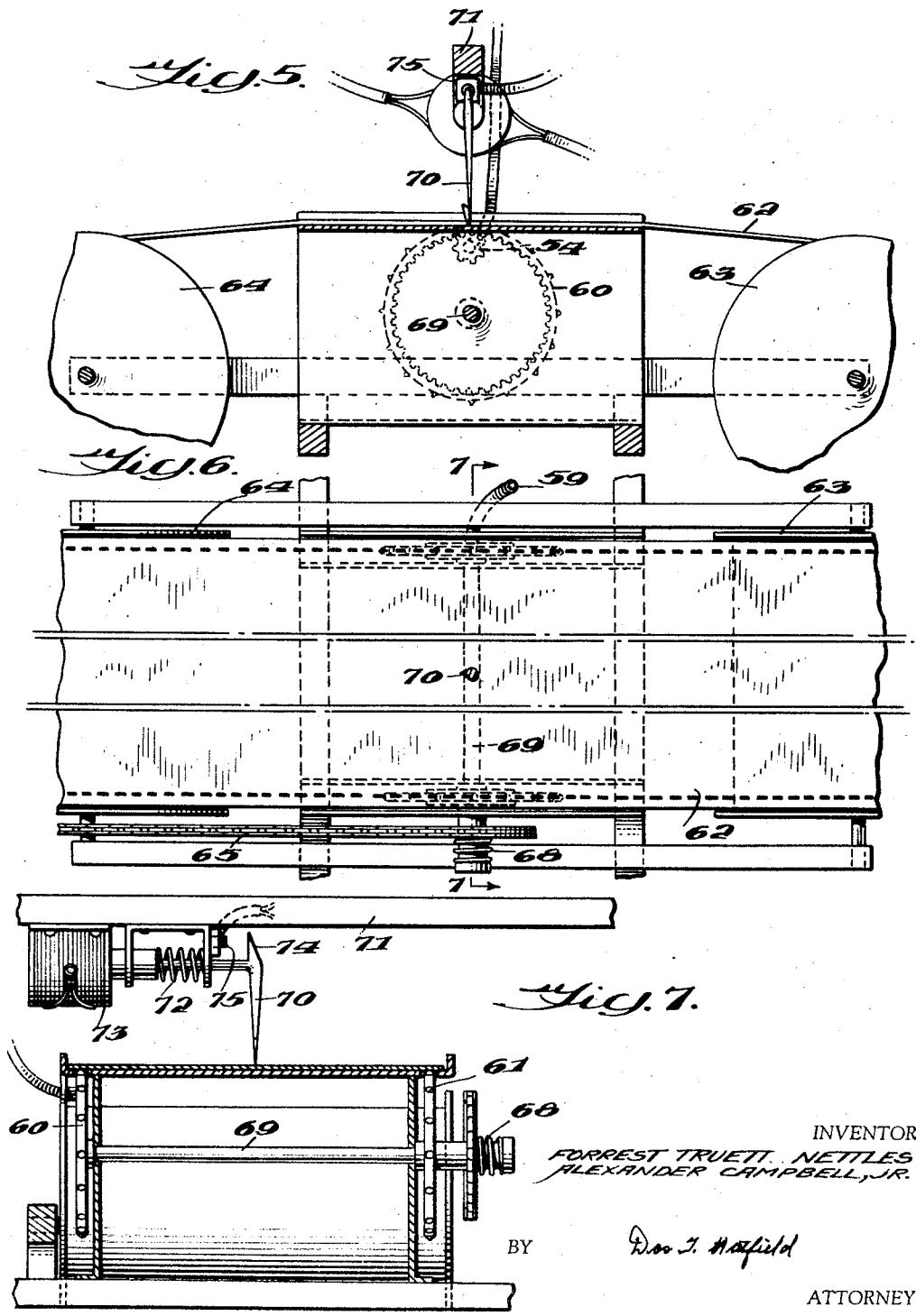
INVENTORS
FORREST TRUETT NETTLES
ALEXANDER CAMPBELL, JR.
BY
ATTORNEY

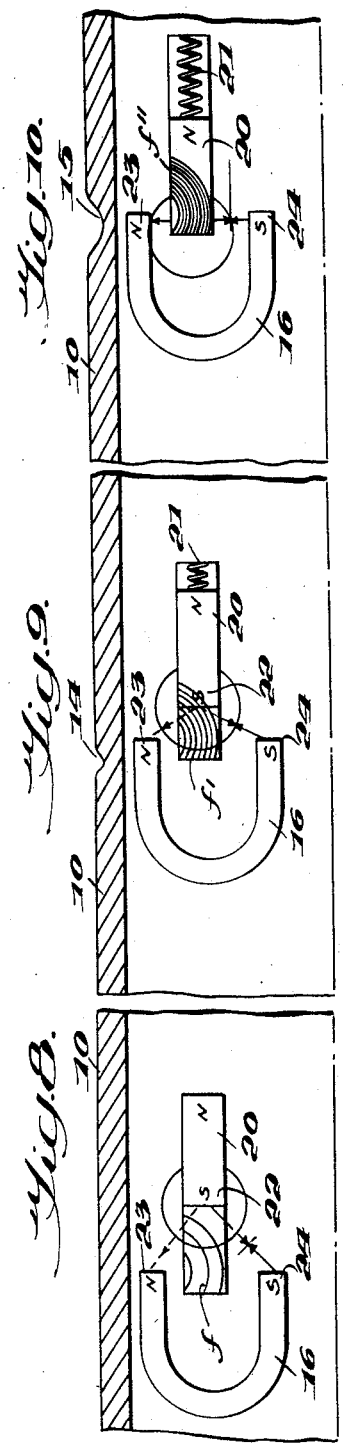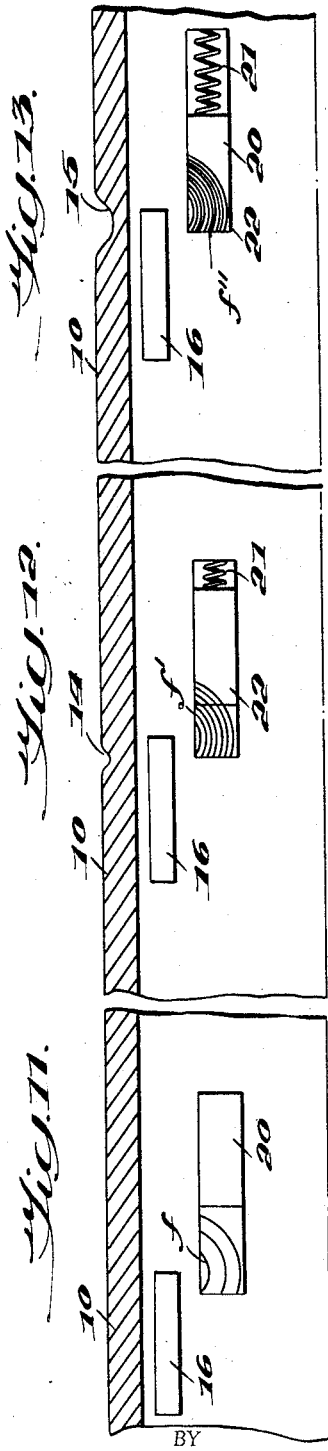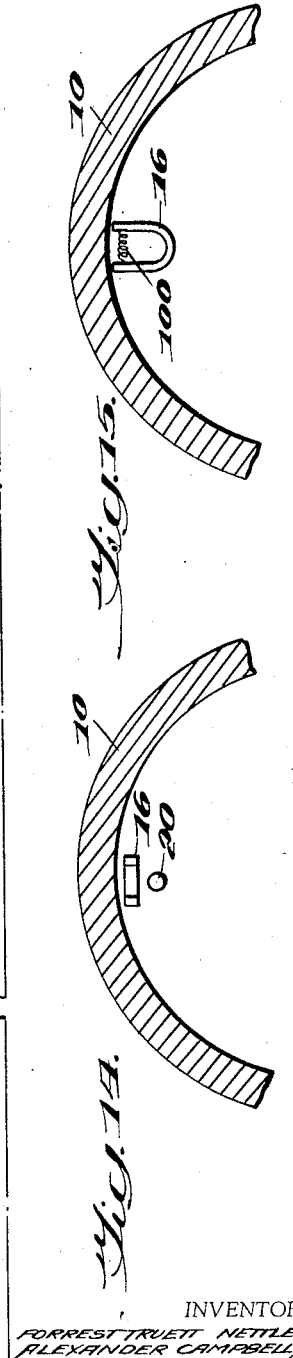

June 23, 1959  F. T. NETTLES ET AL  2,892,150
THICKNESS GAUGE
Filed May 12, 1953  7 Sheets-Sheet 6
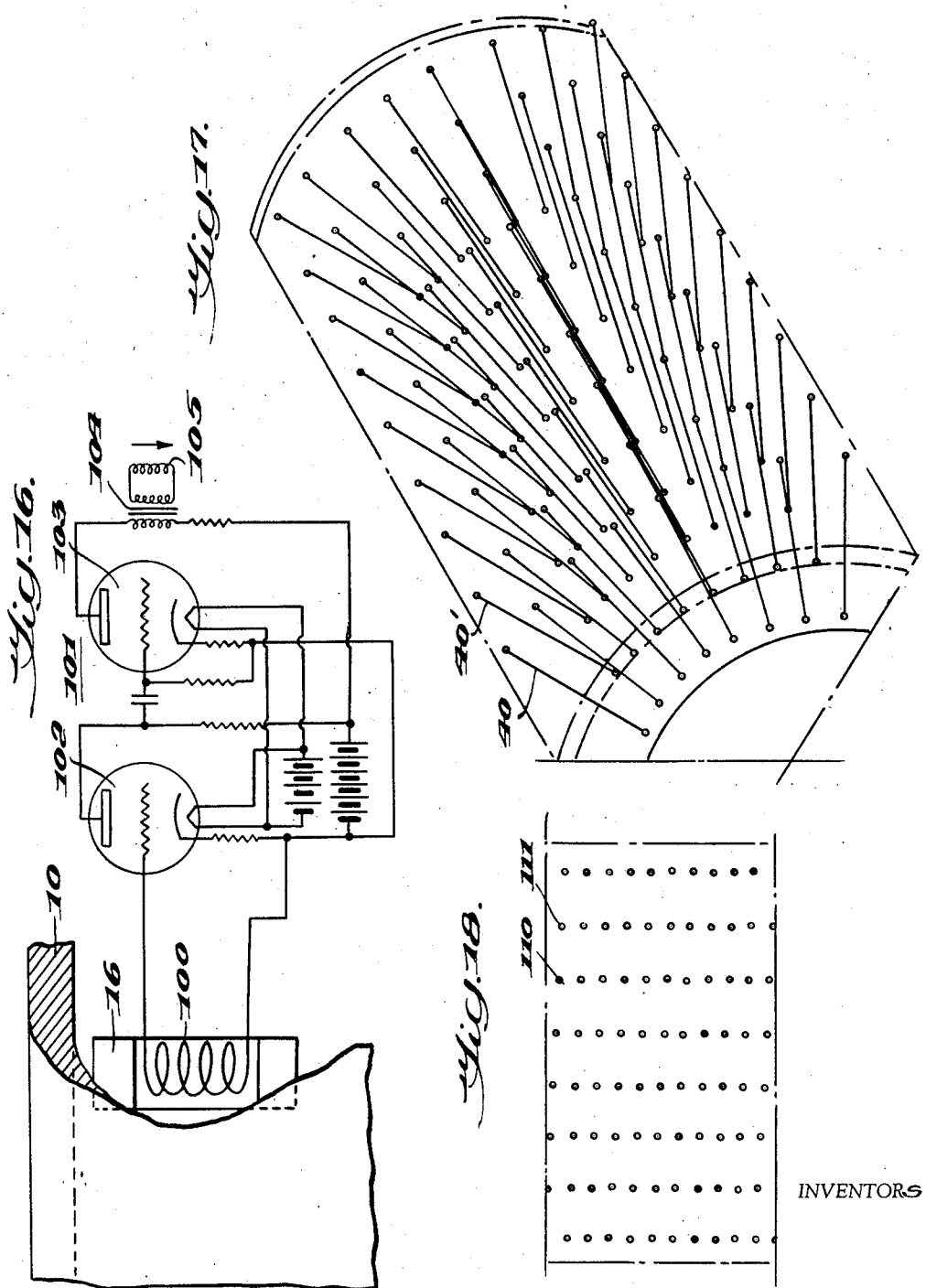
INVENTORS
FORREST TRUETT NETTLES,
BY ALEXANDER CAMPBELL, JR.
ATTORNEY June 23, 1959     F. T. NETTLES ET AL     2,892,150

THICKNESS GAUGE

Filed May 12, 1953     7 Sheets-Sheet 7

INVENTORS
FORREST TRUETT NETTLES,
ALEXANDER CAMPBELL, JR.

BY Don T. Hatfield

ATTORNEY

United States Patent Office 2,892,150
Patented June 23, 1959

2,892,150

THICKNESS GAUGE

Forrest Truett Nettles and Alexander Campbell, Jr., Shreveport, La.

Application May 12, 1953, Serial No. 354,564

31 Claims. (Cl. 324—37)

This invention relates to a method and apparatus for indicating and/or recording variations in thickness of a wall of magnetic material, and more particularly to methods and apparatus for use in locating corrosion in the walls of pipes of magnetic material.

The present extensive system of natural gas distribution and oil pipelines requires the use of thousands of miles of underground iron or steel pipe. Such buried pipe is, of course, subject to ultimate corrosion in spite of the measures taken to prevent corrosion before burying the pipe. It is, of course, not practicable to periodically uncover the pipe to inspect for signs of corrosion. Any corrosion results in a diminution of thickness of the pipe wall. Since the pipe wall is of magnetic material, this inveniton proposes to indicate and record the extent of and the position of corroded areas of pipe wall by the variations in effect of the pipe wall on a magnetic field due to the variations in thickness of the pipe wall as caused by the corrosion.

It is a principal object of the present invention to provide an improved method and apparatus for indicating and/or recording variations in thickness of a wall of magnetic material by indicating the changes in effect on a magnetic field of constant strength as caused by the variations in thickness of the wall, the magnetic field being maintained in predetermined relation to the wall as the wall and magnetic field are moved relative to each other.

In practicing the invention, a magnetic field of constant strength is produced and moved in a plane parallel to the magnetic wall so that variations in thickness of the wall will cause corresponding variations in the distortion of the magnetic field due to the proximity of the wall, and movable means responsive to the distortion of the magnetic field is arranged to indicate the variations in thickness of the pipe wall and/or record such variations in relation to the movement of the magnetic field producing means along the wall.

Another object of the invention is to provide an improved method and apparatus for indicating and/or recording variations in thickness of buried pipe wall of magnetic material from within the pipe without requiring that the pipe be exposed to view and without interfering with the passage of fluids through the pipe.

To attain the aforesaid object according to the invention, a framework adapted to support magnetic field producing and magnetic field distortion indicating and recording apparatus is arranged to be passed through the pipe by fluid pressure within the pipe and variations in thickness of the pipe wall, causing corresponding variations in the distortion of the magnetic field are thereby indicated and recorded. If desired, means to apply a radioactive marking coating to the inside of the pipe wall is also arranged to be actuated by distortions of the magnetic field indicative of diminution of pipe wall thickness due to corrosion to thus facilitate the eventual location and discovery of the corroded area of the pipe with the use of radiation detectors.

Further objects, features and the attending advantages of the invention will be apparent with reference to the following specification and drawings in which:

Fig. 5 is an enlarged fragmentary section to show details of the stylus and recording tape, shown in Fig. 1;

Fig. 6 is a top plan view of Fig. 5;

Fig. 7 is a section on the line 7—7 of Fig. 6;

Figs. 8 through 15 are diagrammatic representations of the feeler magnet assembly to show the physical effects involved when encountering various conditions of pipe corrosion;

Fig. 16 is a diagrammatic representation of a modified form of the invention; and Figs. 17 and 18 show, diagrammatically, the positions of a plurality of magnetic feeler assemblies to contact essentially all areas of pipe wall.

Figure 1:
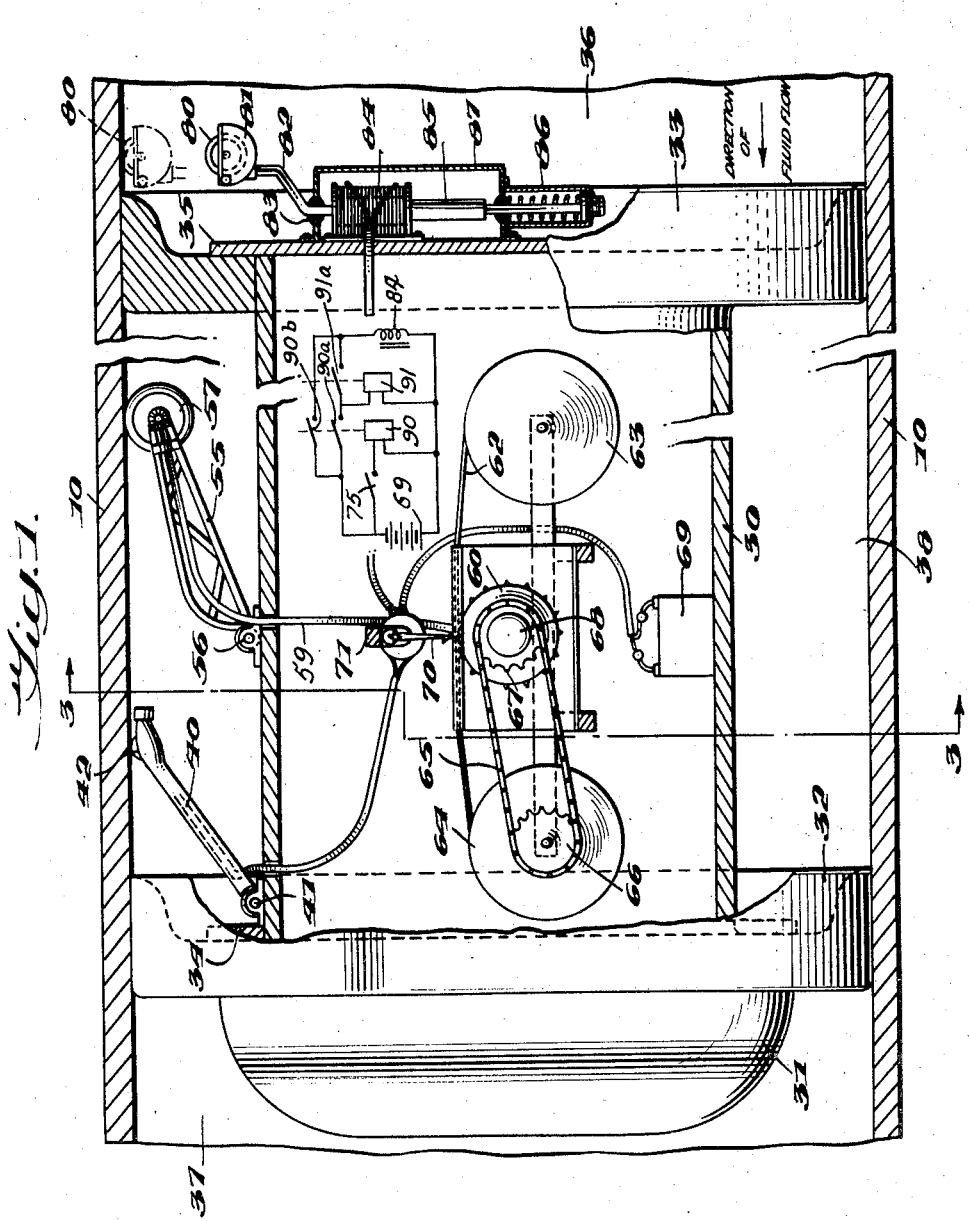
Fig. 1 is a longitudinal section through a pipe, as seen from the side, and showing the apparatus of the invention in the position to be moved within the pipe, such apparatus being partly broken away in section to show various details.

Referring first to Figs. 8 through 14 for an explanation and understanding of the physical principles involved in practicing the invention, a cross section of pipe wall of magnetic material is shown at 10. In Figs. 9, 12 and 10, 13 respectively, a first area of corrosion 14 and a second larger area of corrosion 15 are shown with the corresponding diminution of pipe wall thickness. A magnetic field producing element, such as the horseshoe magnet 16, is positioned within the pipe at a predetermined fixed distance from the pipe wall 10. It will be understood that other forms of magnets or electromagnets may be used in place of the horseshoe magnet 16. The magnetic field produced by the magnet 16 is, of course, distributed through the pipe wall 10 of magnetic material to cause a distortion of such magnetic field and a corresponding reduction in number of lines of magnetic force per unit area in the non-magnetic medium adjacent the magnet 16. This is diagrammatically shown in Figs. 8 and 11 by the lines of force $f$. As shown by Fig. 9 and 12, the corroded area 14, causing a diminution in thickness of the wall 10 of magnetic material, changes the distortion of the magnetic field and causes a redistribution of the lines of force to provide a stronger magnetic field having an increased number of lines of force per unit area $f'$ in the non-magnetic medium. In Figs. 10 and 13, the corroded area 15 being still larger, the number of lines of force per unit area $f''$ is even greater.

Figure 19:
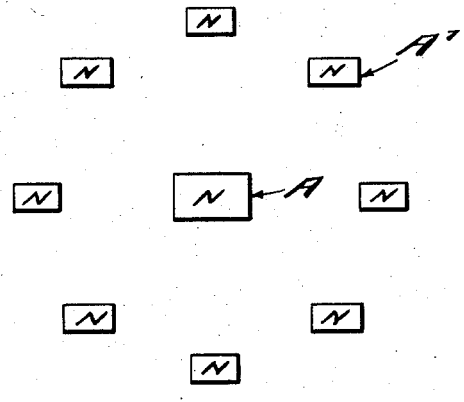
Figs. 19 and 20 show the arrangement of a magnetic "fence," provided for the confinement of the field of feeler magnet 16. This is described in the narrative to follow.
Figure 20:
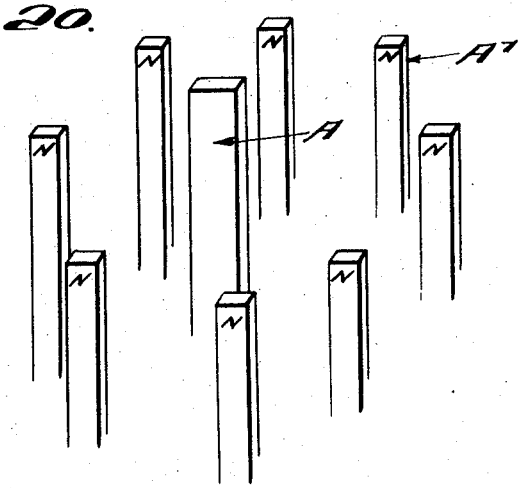

In order that the portion of the field of magnet 16 diverted into the metal mass be concentrated and confined to the particular area being examined, a magnetic "fence" is constructed around the pole of each feeler magnet exposed to the pipe wall. This is shown in Figs. 19 and 20. Each of the magnets labeled A' in the drawing will be of the same polarity as magnet A and of sufficient strength to confine the field of the feeler magnet A to the area immediately adjacent the feeler unit. In this way the flux of the feeler magnet is so concentrated that very minute changes in metal mass at this point will be readily noticeable by use of the device described herein.

According to the invention, an armature 20 of magnetic material, preferably although not necessarily, a permanent magnet is movably positioned in a portion of the magnetic field of the magnet 16 to be constrained in its movement by the magnetic field having the lines of force, such as shown at $f$, $f'$ or $f''$. A tension coil spring 21, as diagrammatically shown in Figs. 9, 10, 12 and 13, may be provided to normally urge the bar magnet 20 away from the poles of the horseshoe magnet 16, and such movement will be opposed by the attraction of that horseshoe magnet pole having the opposite polarity to the polarity of the end of the bar magnet nearest it. In order to enhance this action, it is desirable to mount the bar magnet 20 for a plane of movement that will position, for example, the south magnet pole shown at 22 closer to the north magnet pole 23 of the horseshoe magnet 16 than to the south magnet pole 24. Thus, when the number of lines of force is greatest, as shown at $f''$ in Figs. 10 and 13, the bar magnet 20 will assume the position shown to indicate a large reduction in thickness of the pipe wall 10 due to the corroded area 15, while the position assumed in Figs. 9 and 12 indicates a smaller corroded area 14. The normal thickness of pipe wall is indicated by the position of the bar magnet 20, as shown in Figs. 8 and 11, and the tension of the coil spring 21 may be adjusted to provide such position for a predetermined thickness of pipe wall. It is desired to point out at this time that the armature 20 is not necessarily a magnet but may simply be a bar of magnetizable material, such as iron which is not itself magnetized.

Figures 14 and 15 of the drawings simply show different positions for the horseshoe magnet 16 when using an inductance coil 100 or a base armature 20, and shows how the magnet may assume various positions in relation to the pipe wall so long as the relative positions are maintained as the magnet is moved along the pipe wall to thus maintain constant the distortion effect on the magnetic field by a magnetic wall of uniform thickness. In other words, the magnetic field producing element should be moved in a plane parallel to the surface plane of the magnetic wall being inspected.

Figure 2:
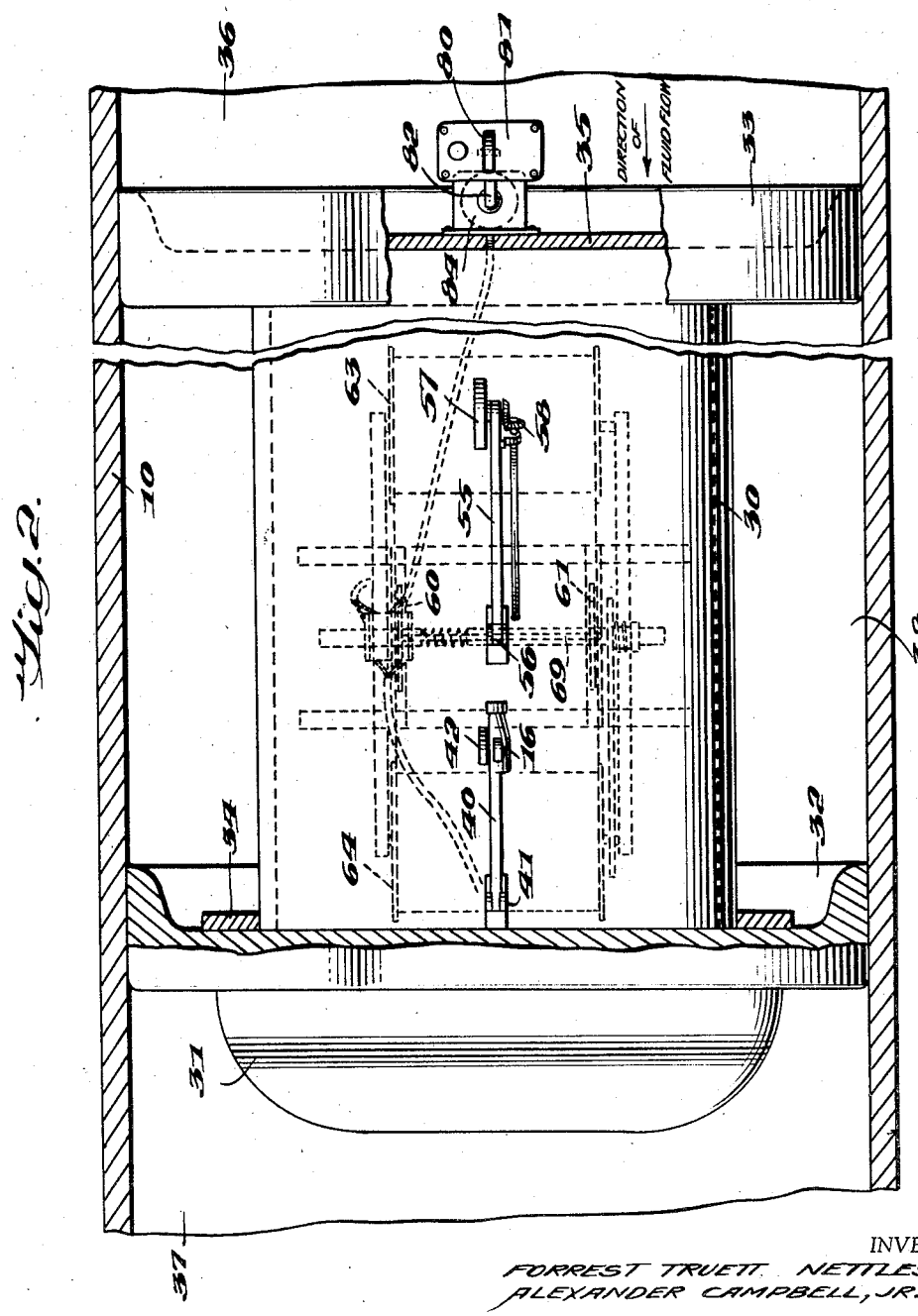
Fig. 2 is a view similar to Fig. 1, but as seen from above.
Figure 3:
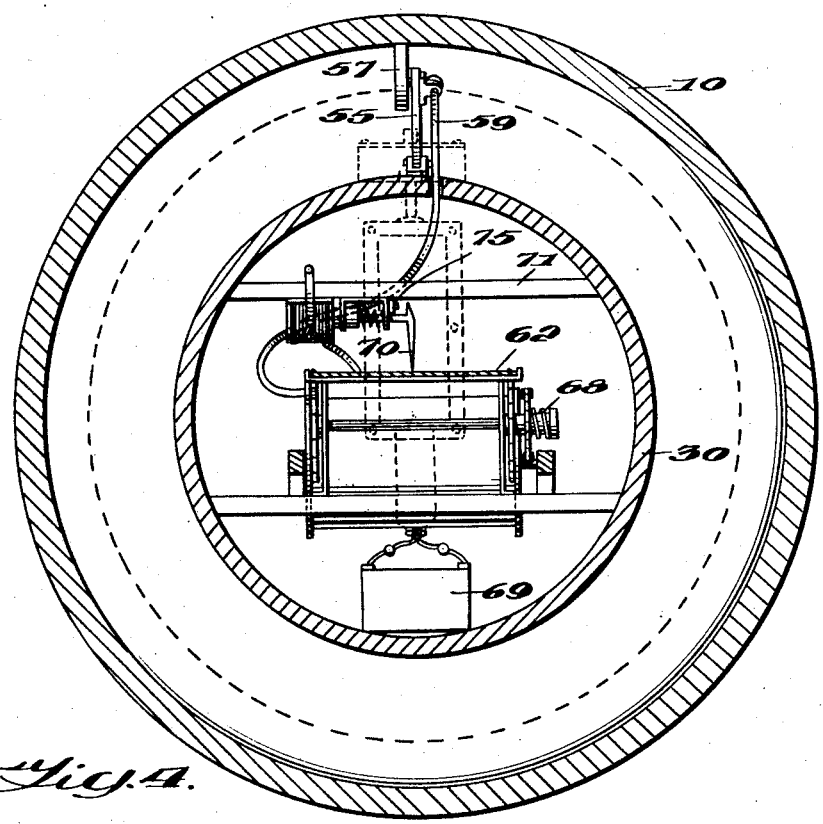
Fig. 3 is a cross section on the line 3—3 of Fig. 1, as seen in the direction of the arrows.
Figure 4:
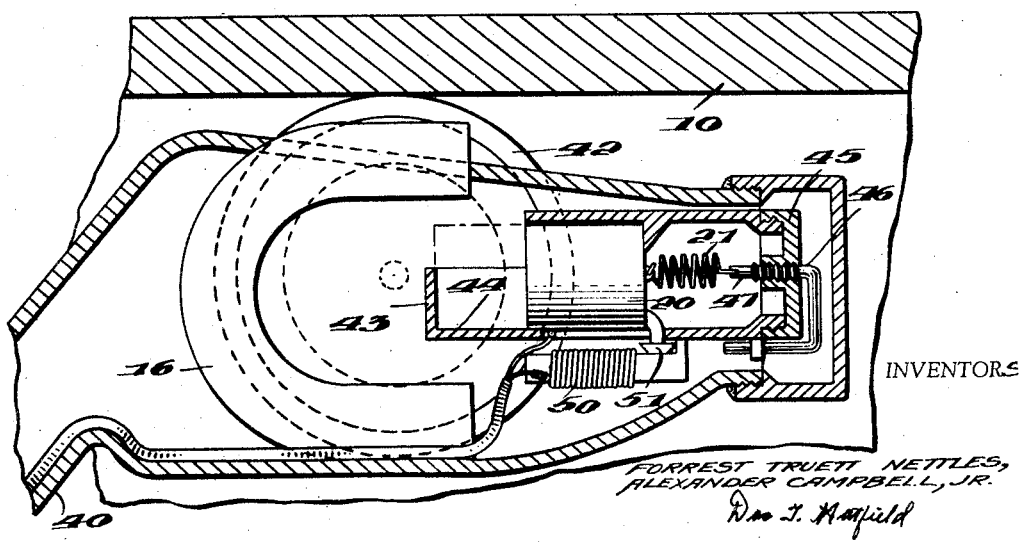
Fig. 4 is an enlarged fragmentary longitudinal section of the end of the magnetic feeler arm, as shown in Fig. 1.

The movement of the magnetic armature 20 may be translated into an indication of variation in wall thickness of a recording of such variation by suitable mechanical or electrical linkage or coupling means. According to the present invention, it is preferable to electrically couple the movement of the magnetic armature 20 to the indicating and recording means and one embodiment of such arrangement for the specific purpose of pipeline corrosion testing will now be described in detail in connection with Figs. 1–7 of the drawings. Supported within the pipe having walls of magnetic material 10 is a framework 30 which may be tubular in form and of such dimensions as to be readily moved through the pipe in the direction of fluid flow, as indicated by the arrows of Figs. 1 and 2. The front or nose end 31 of the framework may be configured as shown to aid in the passage through the pipe. The framework 30 is supported by the gasket seal members 32 and 33 which are secured to the framework by the clamping members 34 and 35, respectively. The entire arrangement of framework 30, gaskets 32, 33 and clamping members 34, 35 is such as to provide a seal to prevent the passage of fluids within the pipe 10 from the areas 36 or 37 into the area 38. Thus, with a flow of fluid under pressure in the direction of the arrows of Figs. 1 and 2, the framework 30 will be caused to be moved through the pipe 10. If desired, pipes and valves (not shown) may be provided to pass the pipeline fluid through plate 35, framework 30, and plate 34 to thus regulate the movement of the framework through the pipe by lessening the fluid pressure against the gasket 33. In this connection, the valves referred to may be governor-controlled to thus regulate the speed of movement. Such arrangements may be made in any suitable manner and need not be further described. Also, if desired, brushes or other suitable devices to sweep foreign objects out of the path of movement of the framework gaskets 32, 33 may be secured to the nose portion 31, although such devices are not shown.

One or more magnetic feeler arms, such as feeler arm 40, may be provided. The feeler arm 40 is pivoted at 41 to the framework 30 and is constrained towards the inner surface of the pipe wall 10 by suitable spring means (not shown). Under certain conditions, the magnetic attraction of the feeler arm towards the pipe wall 10 may be sufficient to maintain contact of the guide roller 42, more clearly shown in Fig. 4. The horseshoe magnet 16 is supported in the position shown in the upper end of the feeler arm 40 and the guide roller 42 serves to maintain the predetermined spacing of the magnet 16 from the pipe wall 10 as the framework 30 moves through the pipe.

A housing 43, preferably of non-magnetic material is also supported at the end of the feeler arm 40 to provide a guideway 44 for movably supporting the magnetic armature 20. The coil tension spring 21 normally urges the armature 20 to the position shown in Fig. 4, and the tension of the coil spring may be adjusted by rotating the adjusting collar 45 which is threaded at 46 to the spring anchor 47.

The housing 43 also supports a coil 50 whose electrical characteristics are varied by movement of the armature 20 to the left of the drawing in response to the condition of the pipe wall, as previously discussed in detail in connection with Figs. 8–15 of the drawings. For example, the coil 50 may be a resistance element forming a rheostat with the slider 51 carried by the armature 20. Variations in resistance of the rheostat comprising the coil 50 are indicative of the position of the armature 20 and hence the variations of the pipe wall thickness and may be employed to record such variations as will now be described.

Referring now to Figs. 1–3 and 5–7 of the drawings, a trolley arm 55 is pivotally mounted at 56 and is urged by spring means (not shown) to contact the trolley wheel 57 with the inner face of the pipe wall. The trolley wheel 57 is geared at 58 to rotate the flexible shaft 59 and through gearing 54 cause a corresponding rotation of the sprocket wheels 60 and 61 as the trolley wheel 57 is rotated by the movement of the framework 30 through the pipe. A recording tape 62 is thus transported by the sprockets 60 and 61 from the supply spool 63 to the take-up spool 64. The take-up spool 64 is driven by the chain 65 and sprockets 66, 67, the sprocket 67 being driven through a slip clutch 68 from the shaft 69 for sprocket wheels 60 and 61 so that take-up tension is provided for the tape as the recorded tape builds up in diameter on the spool 64.

A stylus pen 70 is supported from a cross-bar 71 and adapted to engage the record tape 62. The position of the stylus is influenced by the combined action of the coil spring 72 and the solenoid 73. The coil of the solenoid 73 is connected in series with the rheostat 50 (Fig. 4) and the terminals of the battery 69 so that when the armature 20 moves to indicate a reduction in pipe wall thickness, the lowered resistance of coil 50 will increase the energization of solenoid coil 73 and move the stylus 70 to the left as shown in Fig. 7. If the diminution in thickness of the pipe wall is great enough, the heel 74 of the stylus 70 will contact the switch button 75 to close another electrical circuit for purposes to be presently described. It should be understood that the transport of the recording tape 62 is synchronized with the movement of the framework 30 through the pipe so that a subsequent study of the tape, with suitable scale markings thereon, will indicate not only the magnitude of the variations in pipe wall thickness, but also their approximate locations as well.

If it is desired to accurately locate excessive diminutions of pipe wall thickness, a marking applicator may be actuated by the electrical circuit closed by the switch 75. Referring now more particularly to Figs. 1 and 2, an applicator roller 80 is rotatably supported in the covered container 81 which may contain a radioactive paint or the like. The container 81 is supported on the rod 82 slidably journalled in the square bushing in a manner to prevent rotation of the rod 82. A solenoid coil 84 surrounds the armature 85 of magnetic material that is integral with the rod 82. A combined spring and dashpot 86 is also secured to the housing 87 of non-magnetic material to snub and control the movement of the rod 82 when the solenoid 84 is energized or deenergized. When the solenoid 84 is energized, the applicator roller is moved to the dotted line position to thus apply a coating of radioactive material to the inside face of the pipe wall in the vicinity of the corroded area. It will be noted that the applicator assembly is positioned on the trailing face of the gasket 33 so that any applied coating will not be smeared by the passage of the gasket.

In order to assure application of a useful amount of coating material when a corroded area of pipe wall is encountered, a circuit for maintaining the energization of the solenoid 84 for a predetermined time interval is provided. The circuit is shown diagrammatically in Fig. 1 to be energized from the battery 69. The push button switch 75 is a momentary contact switch, which, when closed, energizes relay 90. Thus, when switch 75 is closed by detection of a corroded area of pipe wall as previously described, relay 90 is closed to provide an operating circuit, as follows. Operated contact 90a of relay 90 energizes slow release time delay relay 91. Operated contact 90b energizes solenoid 84 of applicator. Operated contacts 91a of time delay relay 91 are in parallel with contacts 90b. In this manner, the coil of the applicator unit is energized for whatever time provided for in the slow release time delay relay 91, no matter what length of time the momentary switch 75 is closed.

In Figs. 15 and 16, a modified form of the invention is show in which an inductance coil 100, placed between the poles of the magnet 16, is used instead of the magnetic armature 20 and resistance coil 50. It will be understood that changes in distribution of the magnetic field of the magnet 16, by variations in thickness of the magnetic wall 10, will cause lines of magnetic force to move across the coil 100 as the magnetic field changes. In such manner, a minute current flow is generated in the coil 100 which may be amplified by the conventional two-stage vacuum tube amplifier 101, including tubes 102 and 103 to produce a usable output signal in the transformer 104 for actuating the indicator or electro-magnetic stylus 105.

Figs. 17 and 18 of the drawings diagrammatically show how a plurality of magnetic feeler arms such as the arm 40, 40' etc. may be positioned on the supporting framework 30 in a manner to obtain simultaneous testing contact of all areas around the circumference of the pipe as the framework is moved through the pipe. The circumferential area of the pipe is opened up in plan in Fig. 18 to show the various contact areas 110, 111 etc. for the different magnetic feeler arms to thus show the staggered arrangement of contacts covering substantially every portion of the pipe. In the interest of simplicity of the drawings, only one magnetic feeler arm and its associated indicating and recording stylus has been specifically described. It should be understood that any desired number of magnetic feeler arms may be used together with any appropriate number of stylus assemblies, it not being essential that each feeler arm has an individually assiciated stylus assembly.

It is believed that the operation of the method and apparatus of the invention is now apparent from the foregoing specific description and need not be further described. Various modifications may be made within the spirit of the invention and the scope of the appended claims.

We claim:

1. Apparatus for indicating variations in thickness of a pipe wall of magnetic material from within the pipe including in combination, a supporting framework having dimensions to allow passage of the framework within the pipe, means to support said framework within the pipe for movement in a predetermined plane through the pipe, means to move said framework through the pipe, a feeler arm carried by said framework and normally urged into contact with the inside wall of the pipe, a magnet for producing a constant magnetic field, said magnet being mounted on said feeler arm in proximity to the wall, an armature of magnetic material, means to movably support said armature on said feeler arm for movement in a portion of the field of said magnet, and means to indicate the movement of said armature as said framework is moved through the pipe to thereby indicate variations in thickness of the pipe wall.

2. Apparatus for indicating variations in thickness of a pipe wall of magnetic material from within the pipe including in combination, a supporting framework having dimensions to allow passage of the framework within the pipe, means to support said framework within the pipe for movement in a predetermined plane through the pipe, means to move said framework through the pipe, a plurality of feeler arms carried by said framework and normally urged into contact with respectively different portions of the inside wall of the pipe, a plurality of magnets for producing a constant magnetic field, respective ones of said magnets being mounted on said feeler arm in proximity to the wall, a plurality of armatures of magnetic material, means to movably support respective ones of said armatures on said feeler arm for movement in a portion of the field of respective ones of said magnets, and means to indicate the movement of any ones of said armatures as said framework is moved through the pipe to thereby indicate variations in thickness of the pipe wall.

3. Apparatus for indicating variations in thickness of a pipe wall of magnetic material from within the pipe including in combination, a supporting framework having dimensions to allow passage of the framework within the pipe, means to support said framework within the pipe for movement in a predetermined plane through the pipe, means to move said framework through the pipe, a feeler arm carried by said framework and normally urged into contact with the inside wall of the pipe, a magnet for producing a constant magnetic field, said magnet being mounted on said feeler arm in proximity to the wall, an armature of magnetic material, means to movably support said armature on said feeler arm for movement in a portion of the field of said magnet, a coil, means to mount said coil on said feeler arm, means to couple said armature to said coil to modify the electrical characteristics of said coil in response to the movement of said armature, the changes in electrical characteristics of said coil as said framework is moved through the pipe thereby being indicative of variations in thickness of the pipe wall, and means to indicate the electrical characteristics of said coil.

4. Apparatus for indicating variations in thickness of a pipe wall of magnetic material from within the pipe including in combination, a supporting framework having dimensions to allow passage of the framework within the pipe, means to support said framework within the pipe for movement in a predetermined plane through the pipe, means to move said framework through the pipe, a feeler arm carried by said framework and normally urged into contact with the inside wall of the pipe, a magnet for producing a constant magnetic field, said magnet being mounted on said feeler arm in proximity to the wall, an armature of magnetic material, means to movably support said armature on said feeler arm for movement in a portion of the field of said magnet, a resistance coil, means to couple said armature to vary the resistance of said coil in response to the movable position of said armature, and means to indicate the resistance of said coil, the changes in resistance of said coil being indicative of variations in thickness of the pipe wall as the framework is moved within the pipe.

5. Apparatus for indicating and recording variations in thickness of a pipe wall of magnetic material from within the pipe including in combination, a supporting framework having dimensions to allow passage of the framework within the pipe, means to support said framework within the pipe for movment in a predetermined plane through the pipe, means to move said framework through the pipe, a feeler arm carried by said framework and normally urged into contact with the inside wall of the pipe, a magnet for producing a constant magnetic field, said magnet being mounted on said feeler arm in proximity to the wall, an armature of magnetic material, means to movably support said armature on said feeler arm for movement in a portion of the field of said magnet, a recording tape, means to mount said tape within said framework, means to move said tape within said framework as said framework is moved within said pipe, a stylus arranged to apply a record mark to said tape, means to move said stylus in accordance with movement of said armature, the recorded movements of said stylus on said tape being indicative of variations in thickness of the pipe wall as the framework is moved within the pipe.

6. Apparatus for indicating and recording variations in thickness of a pipe wall of magnetic material from within the pipe and including in combination, a supporting framework having dimensions to allow passage of the framework within the pipe, means to support said framework within the pipe for movement in a predetermined plane through the pipe, means to move said framework through the pipe, a feeler arm carried by said framework and normally urged into contact with the inside wall of the pipe, a magnet for producing a constant magnetic field, said magnet being mounted on said feeler arm in proximity to the wall, an armature of magnetic material, means to movably support said armature on said feeler arm for movement in a portion of the field of said magnet, a coil, means to mount said coil on said feeler arm, means to couple said armature to said coil to modify the electrical characteristics of said coil in response to the movement of said armature, the changes in electrical characteristics of said coil as said framework is moved through the pipe thereby being indicative of variations in thickness of the pipe wall, a recording tape, means to mount said tape within said framework, means to move said tape within said framework as said framework is moved within said pipe, a stylus arranged to apply a record mark to said tape, electromagnetic means to move said stylus in accordance with changes in electrical characteristics of said coil, the recorded movements of said stylus on said tape being indicative of variations in thickness of the pipe wall as the framework is moved within the pipe.

7. Apparatus for indicating variations in thickness of a pipe wall of magnetic material from within the pipe including in combination, a supporting framework having dimensions to allow passage of the framework within the pipe, means to support said framework within the pipe for movement in a predetermined plane through the pipe, means to move said framework through the pipe, a feeler arm carried by said framework and normally urged into contact with the inside wall of the pipe, a magnet for producing a constant magnetic field, said magnet being mounted on said feeler arm in proximity to the wall, an armature of magnetic material, means to movably support said armature on said feeler arm for movement in a portion of the field of said magnet, means to indicate the position of said armature, said armature having a normal position corresponding to a normal thickness of pipe wall, and means responsive to movement of said armature as a thickness of pipe wall less than the normal thickness of pipe wall is encountered to apply a marking substance to the inside of the pipe wall in the vicinity of such encountered lessened thickness of pipe wall.

8. Apparatus for indicating variations in thickness of a pipe wall of magnetic material from within the pipe including in combination, a supporting framework having dimensions to allow passage of the framework within the pipe, means to support said framework within the pipe for movement in a predetermined plane through the pipe, means to move said framework through the pipe, a feeler arm carried by said framework and normally urged into contact with the inside wall of the pipe, a magnet for producing a constant magnetic field, said magnet being mounted on said feeler arm in proximity to the wall, an armature of magnetic material, means to movably support said armature on said feeler arm for movement in a portion of the field of said magnet, means to indicate the position of said armature, said armature having a normal position corresponding to a normal thickness of pipe wall, and means responsive to movement of said armature as a thickness of pipe wall less than the normal thickness of pipe wall is encountered to apply a radioactive marking substance to the inside of the pipe wall in the vicinity of such encountered lessened thickness of pipe wall.

9. Apparatus for indicating variations in thickness of a pipe wall of magnetic material from within the pipe including in combination, a supporting framework having dimensions to allow passage of the framework within the pipe, gasket means to support said framework within the pipe for movement in a predetermined plane through the pipe, said gasket means adapted to seal against the inner walls of the pipe and to cause said framework to be moved through said pipe by fluid pressure within the pipe, a feeler arm carried by said framework and normally urged into contact with the inside wall of the pipe, a magnet for producing a constant magnetic field, said magnet being mounted on said feeler arm in proximity to the wall, an armature of magnetic material, means to movably support said armature on said feeler arm for movement in a portion of the field of said magnet, and means to indicate the movement of said armature as said framework is moved through the pipe to thereby indicate variations in thickness of the pipe wall.

10. Apparatus for indicating variations in thickness of a pipe wall of magnetic material from within the pipe including in combination, a supporting framework having dimensions to allow passage of the framework within the pipe, gasket means to support said framework within the pipe for movement in a predetermined plane through the pipe, said gasket means adapted to seal against the inner walls of the pipe and to cause said framework to be moved through said pipe by fluid pressure within the pipe, a plurality of feeler arms carried by said framework and normally urged into contact with respectively different portions of the inside wall of the pipe, a plurality of magnets for producing a constant magnetic field, respective ones of said magnets being mounted on said feeler arm in proximity to the wall, a plurality of armatures of magnetic material, means to movably support respective ones of said armatures on said feeler arm for movement in a portion of the field of respective ones of said magnets, and means to indicate the movement of any ones of said armatures as said framework is moved through the pipe to thereby indicate variations in thickness of the pipe wall.

11. Apparatus for indicating variations in thickness of a pipe wall of magnetic material from within the pipe including in combination, a supporting framework having dimensions to allow passage of the framework within the pipe, gasket means to support said framework within the pipe for movement in a predetermined plane through the pipe, said gasket means adapted to seal against the inner walls of the pipe and to cause said framework to be moved through said pipe by fluid pressure within the pipe, a feeler arm carried by said framework and normally urged into contact with the inside wall of the pipe, a magnet for producing a constant magnetic field, said magnet being mounted on said feeler arm in proximity to the wall, an armature of magnetic material, means to movably support said armature on said feeler arm for movement in a portion of the field of said magnet, a coil, means to mount said coil on said feeler arm, means to couple said armature to said coil to modify the electrical characteristics of said coil in response to the movement of said armature, the changes in electrical characteristics of said coil as said framework is moved through the pipe thereby being indicative of variations in thickness of the pipe wall, and means to indicate the electrical characteristics of said coil.

12. Apparatus for indicating variations in thickness of a pipe wall of magnetic material from within the pipe including in combination, a supporting framework having dimensions to allow passage of the framework within the pipe, gasket means to support said framework within the pipe for movement in a predetermined plane through the pipe, said gasket means adapted to seal against the inner walls of the pipe and to cause said framework to be moved through said pipe by fluid pressure within the pipe, a feeler arm carried by said framework and normally urged into contact with the inside wall of the pipe, a magnet for producing a constant magnetic field, said magnet being mounted on said feeler arm in proximity to the wall, an armature of magnetic material, means to movably support said armature on said feeler arm for movement in a portion of the field of said magnet, a resistance coil, means to couple said armature to vary the resistance of said coil in response to the movable position of said armature, and means to indicate the resistance of said coil, the changes in resistance of said coil being indicative of variations in thickness of the pipe wall as the framework is moved within the pipe.

13. Apparatus for indicating and recording variations in thickness of a pipe wall of magnetic material from within the pipe including in combination, a supporting framework having dimensions to allow passage of the framework within the pipe, gasket means to support said framework within the pipe for movement in a predetermined plane through the pipe, said gasket means adapted to seal against the inner walls of the pipe and to cause said framework to be moved through said pipe by fluid pressure within the pipe, a feeler arm carried by said framework and normally urged into contact with the inside wall of the pipe, a magnet for producing a constant magnetic field, said magnet being mounted on said feeler arm in proximity to the wall, an armature of magnetic material, means to movably support said armature on said feeler arm for movement in a portion of the field of said magnet, a recording tape, means to mount said tape within said framework, means to move said tape within said framework as said framework is moved within said pipe, a stylus arranged to apply a record mark to said tape, means to move said stylus in accordance with movement of said armature, the recorded movements of said stylus on said tape being indicative of variations in thickness of the pipe wall as the framework is moved within the pipe.

14. Apparatus for indicating and recording variations in thickness of a pipe wall of magnetic material from within the pipe including in combination, a supporting framework having dimensions to allow passage of the framework within the pipe, gasket means to support said framework within the pipe for movement in a predetermined plane through the pipe, said gasket means adapted to seal against the inner walls of the pipe and to cause said framework to be moved through said pipe by fluid pressure within the pipe, a feeler arm carried by said framework and normally urged into contact with the inside wall of the pipe, a magnet for producing a constant magnetic field, said magnet being mounted on said feeler arm in proximity to the wall, an armature of magnetic material, means to movably support said armature on said feeler arm for movement in a portion of the field of said magnet, a coil, means to mount said coil on said feeler arm, means to couple said armature to said coil to modify the electrical characteristics of said coil in response to the movement of said armature, the changes in electrical characteristics of said coil as said framework is moved through the pipe thereby being indicative of variations in thickness of the pipe wall, a recording tape, means to mount said tape within said framework, means to move said tape within said framework as said framework is moved within said pipe, a stylus arranged to apply a record mark to said tape, electromagnetic means to move said stylus in accordance with changes in electrical characteristics of said coil, the recorded movements of said stylus on said tape being indicative of variations in thickness of the pipe wall as the framework is moved within the pipe.

15. Apparatus for indicating variations in thickness of a pipe wall of magnetic material from within the pipe including in combination, a supporting framework having dimensions to allow passage of the framework within the pipe, gasket means to support said framework within the pipe for movement in a predetermined plane through the pipe, said gasket means adapted to seal against the inner walls of the pipe and to cause said framework to be moved through said pipe by fluid pressure within the pipe, a feeler arm carried by said framework and normally urged into contact with the inside wall of the pipe, a magnet for producing a constant magnetic field, said magnet being mounted on said feeler arm in proximity to the wall, an armature of magnetic material, means to movably support said armature on said feeler arm for movement in a portion of the field of said magnet, means to indicate the position of said armature, said armature having a normal position corresponding to a normal thickness of pipe wall, and means responsive to movement of said armature as a thickness of pipe wall less than the normal thickness of pipe wall is encountered to apply a marking substance to the inside of the pipe wall in the vicinity of such encountered lessened thickness of pipe wall.

16. Apparatus for indicating variations in thickness of a pipe wall of magnetic material from within the pipe including in combination, a supporting framework having dimensions to allow passage of the framework within the pipe, gasket means to support said framework within the pipe for movement in a predetermined plane through the pipe, said gasket means adapted to seal against the inner walls of the pipe and to cause said framework to be moved through said pipe by fluid pressure within the pipe, a feeler arm carried by said framework and normally urged into contact with the inside wall of the pipe, a magnet for producing a constant magnetic field, said magnet being mounted on said feeler arm in proximity to the wall, an armature of magnetic material, means to movably support said armature on said feeler arm for movement in a portion of the field of said magnet, means to indicate the position of said armature, said armature having a normal position corresponding to a normal thickness of pipe wall, and means responsive to movement of said armature as a thickness of pipe wall less than the normal thickness of pipe wall is encountered to apply a radioactive marking substance to the inside of the pipe wall in the vicinity of such encountered lessened thickness of pipe wall.

17. Apparatus for indicating variations in thickness of a pipe wall of magnetic material from within the pipe including in combination, a supporting framework having dimensions to allow passage of the framework within the pipe, means to support said framework within the pipe for movement in a predetermined plane through the pipe, means to move said framework through the pipe, a feeler arm carried by said framework and normally urged into contact with the inside wall of the pipe, a first magnet for producing a constant magnetic field, said first magnet being mounted on said feeler arm in proximity to the wall, an armature consisting of a bar magnet, means to movably support said armature on said feeler arm for movement in a portion of the field of said first magnet with one of its magnet poles adjacent an unlike pole of said first magnet, and means to indicate the movement of said armature as said framework is moved through the pipe to thereby indicate variations in thickness of the pipe wall.

18. Apparatus for indicating variations in thickness of a pipe wall of magnetic material from within the pipe including in combination, a supporting framework having dimensions to allow passage of the framework within the pipe, means to support said framework within the pipe for movement in a predetermined plane through the pipe, means to move said framework through the pipe, a feeler arm carried by said framework and normally urged into contact with the inside wall of the pipe, a first magnet for producing a constant magnetic field, said first magnet being mounted on said feeler arm in proximity to the wall, an armature consisting of a bar magnet, means to movably support said armature on said feeler arm for movement in a portion of the field of said first magnet with one of its magnet poles adjacent an unlike pole of said first magnet, a coil, means to mount said coil on said feeler arm, means to couple said armature to said coil to modify the electrical characteristics of said coil in response to the movement of said armature, the changes in electrical characteristics of said coil as said framework is moved through the pipe thereby being indicative of variations in thickness of the pipe wall, and means to indicate the electrical characteristics of said coil.

19. Apparatus for indicating variations in thickness of a pipe wall of magnetic material from within the pipe including in combination, a supporting framework having dimensions to allow passage of the framework within the pipe, means to support said framework within the pipe for movement in a predetermined plane through the pipe, means to move said framework through the pipe, a feeler arm carried by said framework and normally urged into contact with the inside wall of the pipe, a first magnet for producing a constant magnetic field, said first magnet being mounted on said feeler arm in proximity to the wall, an armature consisting of a bar magnet, means to movably support said armature on said feeler arm for movement in a portion of the field of said first magnet with one of its magnet poles adjacent an unlike pole of said first magnet, a resistance coil, means to couple said armature to vary the resistance of said coil in response to the movable position of said armature, and means to indicate the resistance of said coil, the changes in resistance of said coil being indicative of variations in thickness of the pipe wall as the framework is moved within the pipe.

20. Apparatus for indicating and recording variations in thickness of a pipe wall of magnetic material from within the pipe including in combination, a supporting framework having dimensions to allow passage of the framework within the pipe, means to support said framework within the pipe for movement in a predetermined plane through the pipe, means to move said framework through the pipe, a feeler arm carried by said framework and normally urged into contact with the inside wall of the pipe, a first magnet for producing a constant magnetic field, said first magnet being mounted on said feeler arm in proximity to the wall, an armature consisting of a bar magnet, means to movably support said armature on said feeler arm for movement in a portion of the field of said first magnet with one of its magnet poles adjacent an unlike pole of said first magnet, a recording tape, means to mount said tape within said framework, means to move said tape within said framework as said framework is moved within said pipe, a stylus arranged to apply a record mark to said tape, means to move said stylus in accordance with movement of said armature, the recorded movements of said stylus on said tape being indicative of variations in thickness of the pipe wall as the framework is moved within the pipe.

21. Apparatus for indicating and recording variations in thickness of a pipe wall of magnetic material from within the pipe including in combination, a supporting framework having dimensions to allow passage of the framework within the pipe, means to support said framework within the pipe for movement in a predetermined plane through the pipe, means to move said framework through the pipe, a feeler arm carried by said framework and normally urged into contact with the inside wall of the pipe, a first magnet for producing a constant magnetic field, said first magnet being mounted on said feeler arm in proximity to the wall, an armature consisting of a bar magnet, means to movably support said armature on said feeler arm for movement in a portion of the field of said first magnet with one of its magnet poles adjacent an unlike pole of said first magnet, a coil, means to mount said coil on said feeler arm, means to couple said armature to said coil to modify the electrical characteristics of said coil in response to the movement of said armature, the changes in electrical characteristics of said coil as said framework is moved through the pipe thereby being indicative of variations in thickness of the pipe wall, a recording tape, means to mount said tape within said framework, means to move said tape within said framework as said framework is moved within said pipe, a stylus arranged to apply a record mark to said tape, electromagnetic means to move said stylus in accordance with changes in electrical characteristics of said coil, the recorded movements of said stylus on said tape being indicative of variations in thickness of the pipe wall as the framework is moved within the pipe.

22. Apparatus for indicating variations in thickness of a pipe wall of magnetic material from within the pipe including in combination, a supporting framework having dimensions to allow passage of the framework within the pipe, means to support said framework within the pipe for movement in a predetermined plane through the pipe, means to move said framework through the pipe, a feeler arm carried by said framework and normally urged into contact with the inside wall of the pipe, a first magnet for producing a constant magnetic field, said first magnet being mounted on said feeler arm in proximity to the wall, an armature consisting of a bar magnet, means to movably support said armature on said feeler arm for movement in a portion of the field of said first magnet with one of its magnet poles adjacent an unlike pole of said first magnet, means to indicate the position of said armature, said armature having a normal position corresponding to a normal thickness of pipe wall, and means responsive to movement of said armature as a thickness of pipe wall less than the normal thickness of pipe wall is encountered to apply a marking substance to the inside of the pipe wall in the vicinity of such encountered lessened thickness of pipe wall.

23. Apparatus for indicating variations in thickness of a pipe wall of magnetic material from within the pipe including in combination, a supporting framework having dimensions to allow passage of the framework within the pipe, means to support said framework within the pipe for movement in a predetermined plane through the pipe, means to move said framework through the pipe, a feeler arm carried by said framework and normally urged into contact with the inside wall of the pipe, a first magnet for producing a constant magnetic field, said first magnet being mounted on said feeler arm in proximity to the wall, an armature consisting of a bar magnet, means to movably support said armature on said feeler arm for movement in a portion of the field of said first magnet with one of its magnet poles adjacent an unlike pole of said first magnet, means to indicate the position of said armature, said armature having a normal position corresponding to a normal thickness of pipe wall, and means responsive to movement of said armature as a thickness of pipe wall less than the normal thickness of pipe wall is encountered to apply a radioactive marking substance to the inside of the pipe wall in the vicinity of such encountered lessened thickness of pipe wall.

24. Apparatus for indicating variations in thickness of a pipe wall of magnetic material from within the pipe including in combination, a supporting framework having dimensions to allow passage of the framework within the pipe, gasket means to support said framework within the pipe for movement in a predetermined plane through the pipe, said gasket means adapted to seal against the inner walls of the pipe and to cause said framework to be moved through said pipe by fluid pressure within the pipe, a feeler arm carried by said framework and normally urged into contact with the inside wall of the pipe, a first magnet for producing a constant magnetic field, said first magnet being mounted on said feeler arm in proximity to the wall, an armature consisting of a bar magnet, means to movably support said armature of said feeler arm for movement in a portion of the field of said first magnet with one of its magnet poles adjacent an unlike pole of said first magnet, and means to indicate the movement of said armature as said framework is moved through the pipe to thereby indicate variations in thickness of the pipe wall.

25. Apparatus for indicating variations in thickness of a pipe wall of magnetic material from within the pipe including in combination, a supporting framework having dimensions to allow passage of the framework within the pipe, gasket means to support said framework within the pipe for movement in a predetermined plane through the pipe, said gasket means adapted to seal against the inner walls of the pipe and to cause said framework to be moved through said pipe by fluid pressure within the pipe, a feeler arm carried by said framework and normally urged into contact with the inside wall of the pipe, a first magnet for producing a constant magnetic field, said first magnet being mounted on said feeler arm in proximity to the wall, an armature consisting of a bar magnet, means to movably support said armature on said feeler arm for movement in a portion of the field of said first magnet with one of its magnet poles adjacent an unlike pole of said first magnet, a coil, means to mount said coil on said feeler arm, means to couple said armature to said coil to modify the electrical characteristics of said coil in response to the movement of said armature, the changes in electrical characteristics of said coil as said framework is moved through the pipe thereby being indicative of variations in thickness of the pipe wall, and means to indicate the electrical characteristics of said coil.

26. Apparatus for indicating variations in thickness of a pipe wall of magnetic material from within the pipe including in combination, a supporting framework having dimensions to allow passage of the framework within the pipe, gasket means to support said framework within the pipe for movement in a predetermined plane through the pipe, said gasket means adapted to seal against the inner walls of the pipe and to cause said framework to be moved through said pipe by fluid pressure within the pipe, a feeler arm carried by said framework and normally urged into contact with the inside wall of the pipe, a first magnet for producing a constant magnetic field, said first magnet being mounted on said feeler arm in proximity to the wall, an armature consisting of a bar magnet, means to movably support said armature on said feeler arm for movement in a portion of the field of said first magnet with one of its magnet poles adjacent an unlike pole of said first magnet, a resistance coil, means to couple said armature to vary the resistance of said coil in response to the movable position of said armature, and means to indicate the resistance of said coil, the changes in resistance of said coil being indicative of variations in thickness of the pipe wall as the framework is moved within the pipe.

27. Apparatus for indicating and recording variations in thickness of a pipe wall of magnetic material from within the pipe including in combination, a supporting framework having dimensions to allow passage of the framework within the pipe, gasket means to support said framework within the pipe for movement in a predetermined plane through the pipe, said gasket means adapted to seal against the inner walls of the pipe and to cause said framework to be moved through said pipe by fluid pressure within the pipe, a feeler arm carried by said framework and normally urged into contact with the inside wall of the pipe, a first magnet for producing a constant magnetic field, said first magnet being mounted on said feeler arm in proximity to the wall, an armature consisting of a bar magnet, means to movably support said armature on said feeler arm for movement in a portion of the field of said first magnet with one of its magnet poles adjacent an unlike pole of said first magnet, a recording tape, means to mount said tape within said framework, means to move said tape within said framework as said framework is moved within said pipe, a stylus arranged to apply a record mark to said tape, means to move said stylus in accordance with movement of said armature, the recorded movements of said stylus on said tape being indicative of variations in thickness of the pipe wall as the framework is moved within the pipe.

28. Apparatus for indicating and recording variations in thickness of a pipe wall of magnetic material from within the pipe including in combination, a supporting framework having dimensions to allow passage of the framework within the pipe, gasket means to support said framework within the pipe for movement in a predetermined plane through the pipe, said gasket means adapted to seal against the inner walls of the pipe and to cause said framework to be moved through said pipe by fluid pressure within the pipe, a feeler arm carried by said framework and normally urged into contact with the inside wall of the pipe, a first magnet for producing a constant magnetic field, said first magnet being mounted on said feeler arm in proximity to the wall, an armature consisting of a bar magnet, means to movably support said armature on said feeler arm for movement in a portion of the field of said first magnet with one of its magnet poles adjacent an unlike pole of said first magnet, a coil, means to mount said coil on said feeler arm, means to couple said armature to said coil to modify the electrical characteristics of said coil in response to the movement of said armature, the changes in electrical characteristics of said coil as said framework is moved through the pipe thereby being indicative of variations in thickness of the pipe wall, a recording tape, means to mount said tape within said framework, means to move said tape within said framework as said framework is moved within said pipe, a stylus arranged to apply a record mark to said tape, electromagnetic means to move said stylus in accordance with changes in electrical characteristics of said coil, the recorded movements of said stylus on said tape being indicative of variations in thickness of the pipe wall as the framework is moved within the pipe.

29. Apparatus for indicating variations in thickness of a pipe wall of magnetic material from within the pipe including in combination, a supporting framework having dimensions to allow passage of the framework within the pipe, gasket means to support said framework within the pipe for movement in a predetermined plane through the pipe, said gasket means adapted to seal against the inner walls of the pipe and to cause said framework to be moved through said pipe by fluid pressure within the pipe, a feeler arm carried by said framework and normally urged into contact with the inside wall of the pipe, a first magnet for producing a constant magnetic field, said first magnet being mounted on said feeler arm in proximity to the wall, an armature consisting of a bar magnet, means to movably support said armature on said feeler arm for movement in a portion of the field of said first magnet with one of its magnet poles adjacent an unlike pole of said first magnet, means to indicate the position of said armature, said armature having a normal position corresponding to a normal thickness of pipe wall, and means responsive to movement of said armature as a thickness of pipe wall less than the normal thickness of pipe wall is encountered to applying a marking substance to the inside of the pipe wall in the vicinity of such encountered lessened thickness of pipe wall.

30. Apparatus for indicating variations in thickness of a pipe wall of magnetic material from within the pipe including in combination, a supporting framework having dimensions to allow passage of the framework within the pipe, gasket means to support said framework within the pipe for movement in a predetermined plane through the pipe, said gasket means adapted to seal against the inner walls of the pipe and to cause said framework to be moved through said pipe by fluid pressure within the pipe, a feeler arm carried by said framework and normally urged into contact with the inside wall of the pipe, a first magnet for producing a constant magnetic field, said first magnet being mounted on said feeler arm in proximity to the wall, an armature consisting of a bar magnet, means to movably support said armature on said feeler arm for movement in a portion of the field of said first magnet with one of its magnet poles adjacent an unlike pole of said first magnet, means to indicate the position of said armature, said armature having a normal position corresponding to a normal thickness of pipe wall, and means responsive to movement of said armature as a thickness of pipe wall less than the normal thickness of pipe wall is encountered to apply a radioactive marking substance to the inside of the pipe wall in the vicinity of such encountered lessened thickness of pipe wall.

31. Apparatus for indicating variations in thickness of a pipe wall of magnetic material from within the pipe including in combination, a supporting framework having dimensions to allow passage of the framework within the pipe, means to support said framework within the pipe for movement in a predetermined plane through the pipe, means to move said framework through the pipe, a feeler arm carried by said framework and normally urged into contact with the inside wall of the pipe, a magnet for producing a constant magnetic field, said magnet being mounted on said feeler arm in proximity to the wall, an armature of magnetic material, means to movably support said armature on said feeler arm for movement in a portion of the field of said magnet, means to indicate the position of said armature, said armature having a normal position corresponding to a normal thickness of pipe wall, and means responsive to movement of said armature as a thickness of pipe wall less than the normal thickness of pipe wall is encountered to apply an indicating means to the inside of the pipe wall in the vicinity of such encountered lessened thickness of pipe wall.

References Cited in the file of this patent

UNITED STATES PATENTS

| | | |
|---|---|---|
| 2,011,665 | Watts | Aug. 20, 1935 |
| 2,067,804 | Thorne | Jan. 12, 1937 |
| 2,228,623 | Ennis | Jan. 14, 1941 |
| 2,265,136 | Barnes et al. | Dec. 9, 1941 |
| 2,338,991 | Arnold | Jan. 11, 1944 |
| 2,384,529 | Breitenstein | Sept. 11, 1945 |
| 2,469,476 | Sellars | May 10, 1949 |
| 2,470,338 | Chilton | May 17, 1949 |
| 2,542,893 | Bender et al. | Feb. 20, 1951 |
| 2,553,350 | Bayhi | May 15, 1951 |
| 2,554,844 | Swift | May 29, 1951 |
| 2,558,427 | Fagan | June 26, 1951 |
| 2,651,846 | Rudge | Sept. 15, 1953 |
| 2,684,464 | Hastings | July 20, 1954 |
| 2,698,920 | Gieske | Jan. 4, 1955 |